(12) United States Patent
Eiland (10) Patent No.: US 9,637,069 B2
(45) Date of Patent: May 2, 2017

(54) PORTABLE DEVICE HAVING A CHANGEABLE ILLUMINATED DISPLAY

(76) Inventor: Donald Curtis Eiland, Milpitas, CA (US)

( * ) Notice: Subject to any disclaimer, the term of this patent is extended or adjusted under 35 U.S.C. 154(b) by 521 days.

(21) Appl. No.: 13/533,953

(22) Filed: Jun. 26, 2012

(65) Prior Publication Data

US 2012/0327575 A1 Dec. 27, 2012

Related U.S. Application Data (60) Provisional application No. 61/571,473, filed on Jun. 27, 2011.

(51) Int. Cl.
*B60R 13/10* (2006.01)
*G09F 21/04* (2006.01)
*G09F 7/18* (2006.01)

(52) U.S. Cl.
CPC .............. *B60R 13/105* (2013.01); *G09F 7/18* (2013.01); *G09F 21/04* (2013.01)

(58) Field of Classification Search
CPC ......... H05K 5/00; B60R 13/105; G09F 21/04; G02F 7/18

USPC ...................................... 362/497; 361/679.01
See application file for complete search history.

(56) References Cited

U.S. PATENT DOCUMENTS

| | | | | |
|---|---|---|---|---|
| 5,255,166 A * | 10/1993 | Gonzalez | .................... | 362/497 |
| 6,478,458 B2 * | 11/2002 | Hickman | ..................... | 362/473 |
| 7,581,849 B2 * | 9/2009 | Mock | ............................ | 362/234 |
| 2003/0156038 A1 * | 8/2003 | Hankins | ................... | G09F 9/33 |
| | | | | 340/815.45 |
| 2007/0109145 A1 * | 5/2007 | Tang | .................. | B60R 11/0235 |
| | | | | 340/815.45 |
| 2008/0174985 A1 * | 7/2008 | Hsieh | ............................... | 362/6 |
| 2011/0247248 A1 * | 10/2011 | Dowd | .................. | B60R 13/105 |
| | | | | 40/209 |

* cited by examiner

*Primary Examiner* — Sharon Payne
(74) *Attorney, Agent, or Firm* — Law Office of Herbert T Patty; Herbert T Patty (57) ABSTRACT

The portable device having a changeable illuminated display includes a license plate frame structure having front and back frame structures and a compact image display device closely held between the front and back frame structures, an image displayed by the compact image display being visible through a plurality of openings formed in the front frame structure.

25 Claims, 13 Drawing Sheets

PORTABLE DEVICE HAVING A CHANGEABLE ILLUMINATED DISPLAY

CROSS-REFERENCE TO RELATED APPLICATIONS

The present application claims priority under 35 U.S.C. 119(e) from provisional patent application Ser. No. 61/571,473 filed on Jun. 27, 2011 and titled "Portable Device Having a Changeable Illuminated Display", the entire disclosure of which is hereby incorporated by reference.

STATEMENT REGARDING FEDERALLY SPONSORED RESEARCH OR DEVELOPMENT

Not Applicable

REFERENCE TO A SEQUENCE LISTING, TABLE OR COMPUTER PROGRAM LISTING APPENDIX

Not Applicable

BACKGROUND OF THE INVENTION

1. Field of the Invention

The present invention relates generally to illuminated display devices and methods of displaying indicia, advertisements and other information and more particularly to a portable device having a changeable illuminated display.

2. Description of the Related Art

Illuminated display devices are well known in the art. A common and popular illuminated display device includes an illuminated vehicle license plate frame. Many issued patents are directed to such vehicle license plate frames. Of particular relevance to the subject matter of the instant application is the illuminated license plate frame disclosed in U.S. Pat. No. 7,430,822 to Combs entitled "Electroluminescent Vehicle License Plate Frame for Displaying Advertisement and Associated Method". Advertising text and designs cut, milled or molded on a front portion of the frame are illuminated by recessed strip lighting. The advertising text and designs are disposed in upper and lower center portions and upper and lower left and right portions of the frame in several disclosed embodiments. The frame is designed to be mounted to a vehicle and the recessed strip lighting is powered by a direct current inverter connected to the vehicle's power source.

Known license plate frames are limited in several respects. Firstly, known frames are designed to be mounted to a vehicle. This design feature limits the well-known and visually appealing license plate frame structure and motif to vehicle accessory applications. Further, this design feature renders known license plate frames portable only to the extent of the portability of the vehicle to which they are attached. Secondly, known license plate frames do not provide for illuminated changeable displays in a portable device. As is known, advertising text is often cut, milled, molded, stamped and/or painted onto the license plate frame. Thirdly, known license plate frames generally provide an open space for the display of the contents of the license plate to which they are attached. The open space is not used for the display of advertising text or other indicia.

SUMMARY OF THE INVENTION

The portable device having a changeable illuminated display of the invention provides a unique device that overcomes the limitations of known illuminated license plate frames and provides distinct advantages over existing devices. The device comprises a light-weight license plate frame structure formed to closely receive a compact image display device held within the frame structure. Digital images are displayed by the compact image display device. Due to its small size and construction, the portable device is of light weight and may be attached or hung from a variety of places including the arm of a user to thereby provide a portable and wearable illuminated display device. Digital images are displayable within the license plate frame structure to provide a versatile illuminated display device that may be used in a variety of circumstances and to express a variety of information.

In accordance with an embodiment of the invention, the portable device having illuminated interchangeable displays has a license plate frame structure and a compact image display device closely received in the license plate frame structure. The compact image display device includes interfaces for connection to external devices from which images for display by the portable device can be transferred. The frame structure has a front structure that includes three open portions, the three open portions exposing a portion of the illuminated surface of the compact image display device. The frame structure has a back structure that includes an integral housing for receiving a direct current power source. The compact image display device is closely received between the front and back structures and includes control circuitry coupled in series with the direct current power source.

In accordance with an aspect of the invention, a strap is receivable in slots formed in the back structure of the frame structure. The strap provides a user with the ability to strap the portable device to a limb including his or her arm.

In accordance with another aspect of the invention, the portable device is portable. The small size, thin profile and weight of the portable device make it easily portable and attachable to many structures and place-able upon many surfaces.

In accordance with another aspect of the invention, the portable device is wearable. The small size and weight of the portable device make it attachable to a limb of the user.

In accordance with another aspect of the invention, the portable device is versatile. The portable device is designed to display digital images. Changeable images provide the user with a plurality of information including preferences, advertising, logos and other designs and insignia from which to choose.

In accordance with another aspect of the invention, the compact image display device is an LCD display.

In accordance with another aspect of the invention, the LCD display is electrically coupled to a control circuitry.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended herein.

In this respect, before explaining at least one embodiment of the invention in detail, it is to be understood that the invention is not limited in its application to the details of design and to the arrangement of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other devices for carrying out the several purposes of the present invention. It is important, therefore, that the claims be regarded as including such equivalent devices insofar as they do not depart from the spirit and scope of the present invention.

BRIEF DESCRIPTION OF THE DRAWINGS

The present disclosure may be better understood and its numerous features and advantages made apparent to those skilled in the art by referencing the accompanying drawings wherein.

DETAILED DESCRIPTION OF THE INVENTION

Figure 1:
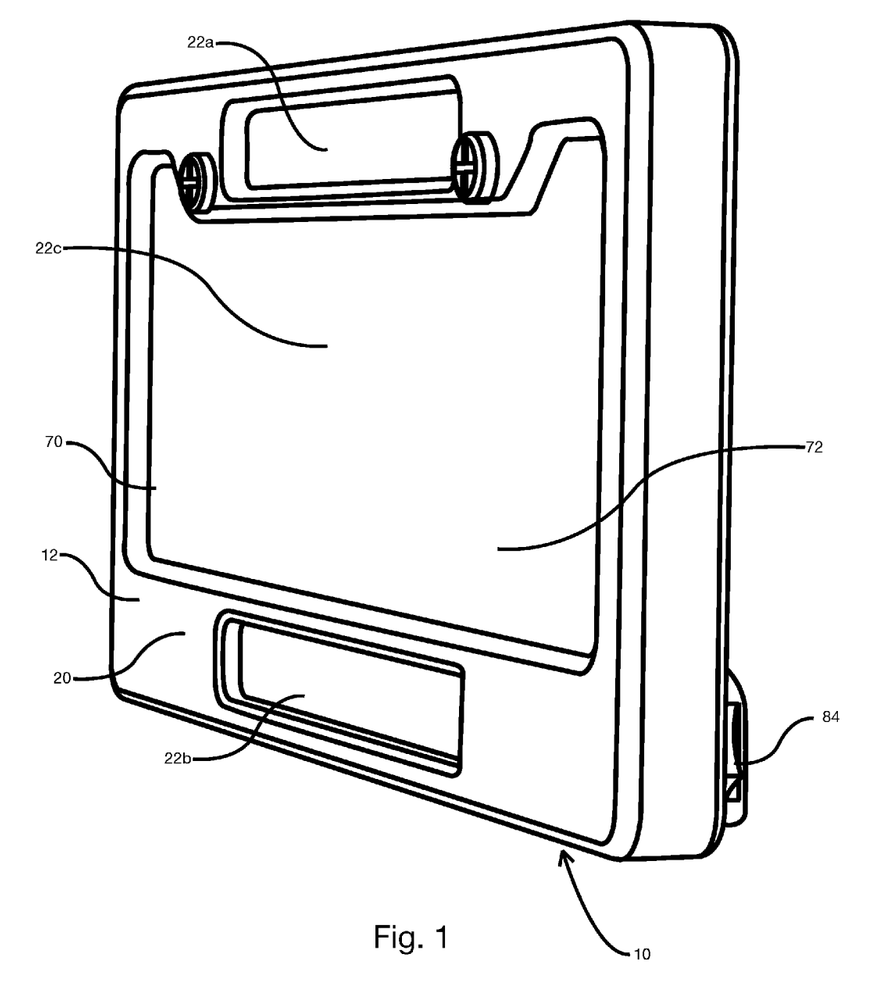
FIG. 1 is a front perspective view of the portable device having a changeable illuminated display in accordance with the invention.

A portable device having a changeable illuminated display generally designated 10 in accordance with the principles of the invention will now be described with reference to the figures. With initial reference to FIGS. 1-3, the portable device having a changeable illuminated display 10 includes a license plate frame structure 12 and a compact image display device 70 closely held within the license plate frame structure 12. Open spaces 22a, 22b and 22c in the license plate frame structure 12 make visible indicia formed on a digital image 60 underlying the open spaces 22a, 22b and 22c.

Figure 5:
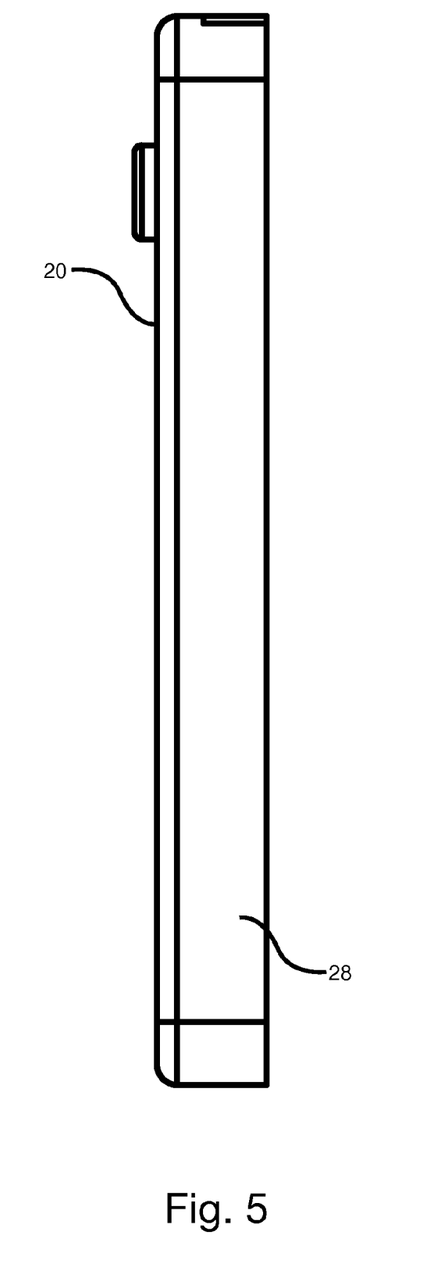
FIG. 5 is an end elevation view of the front structure of the frame structure of FIG. 4.
Figure 6:
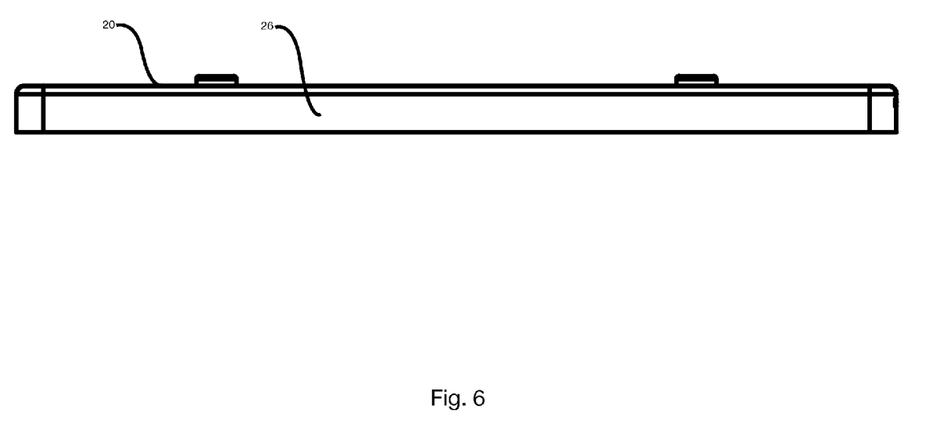
FIG. 6 is a side elevation view of the front structure of the frame structure of FIG. 4.
Figure 7:
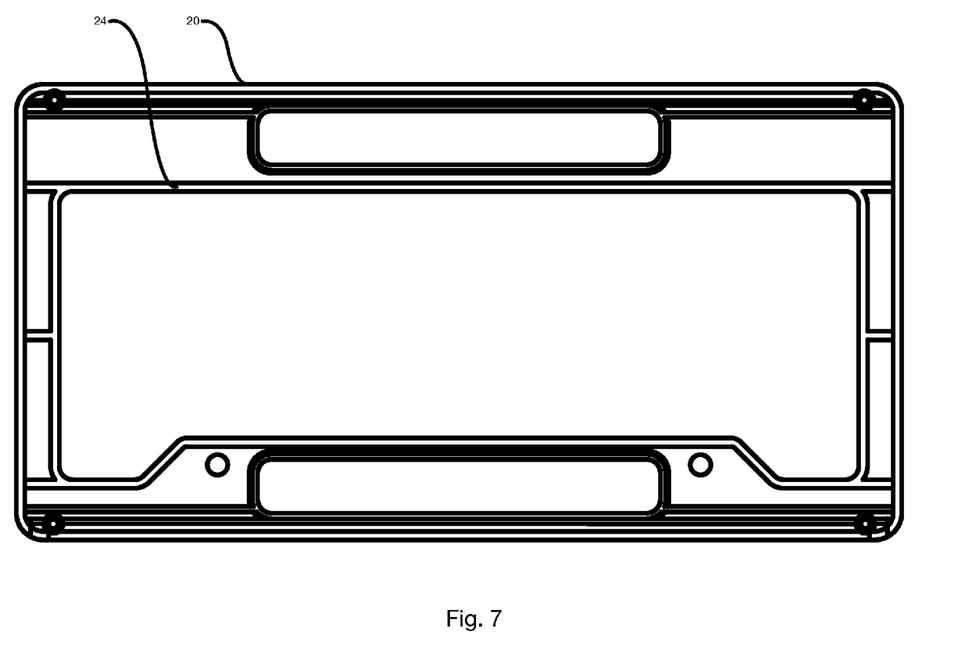
FIG. 7 is a bottom plan view of the front structure of the frame structure of FIG. 4.

The license plate frame structure 12 is preferably formed of a lightweight material such as plastic and is preferably ¼ inches long by 4¼ inches wide by 1 inch thick. The license plate frame structure 12 has a front structure 20 and a back structure 40. The front structure 20 has a thin profile of preferably ½ inch, side portions 26 and end portions 28 (FIG. 5 and FIG. 6). Front and back structures 20 and 40 are shown in subsequent figures as being separate and generally rectangular structures but one skilled in the art will recognize that the front and back structures 20 and 40 may be formed as one structure as for example by injection molding.

Open spaces 22a and 22b are formed in the front structure 20 and are rectangular in shape and of generally equal area. Open spaces 22a and 22b are disposed in the center top and center bottom of the front structure 20 respectively. Open spaces 22a and 22b are preferably 3¼ inches long and one half inch wide. Open space 22c is disposed between open spaces 22a and 22b and has a generally rectangular shape with one irregularly shaped side having five segments that together provide the upper right and left open spaces of open space 22c. Open space 22c is preferably 7½ inches long by 2⅜ inches wide through its central extent and 2¾ inches wide at the widest extent of the upper right and left open spaces. Open space 22c is the space generally reserved for display of the license plate information in known license plate frames. Open spaces 22a, 22b and 22c provide visual access to indicia 62a, 62b and 62c formed on portions of the digital image 60 exposed thereby.

Figure 3:
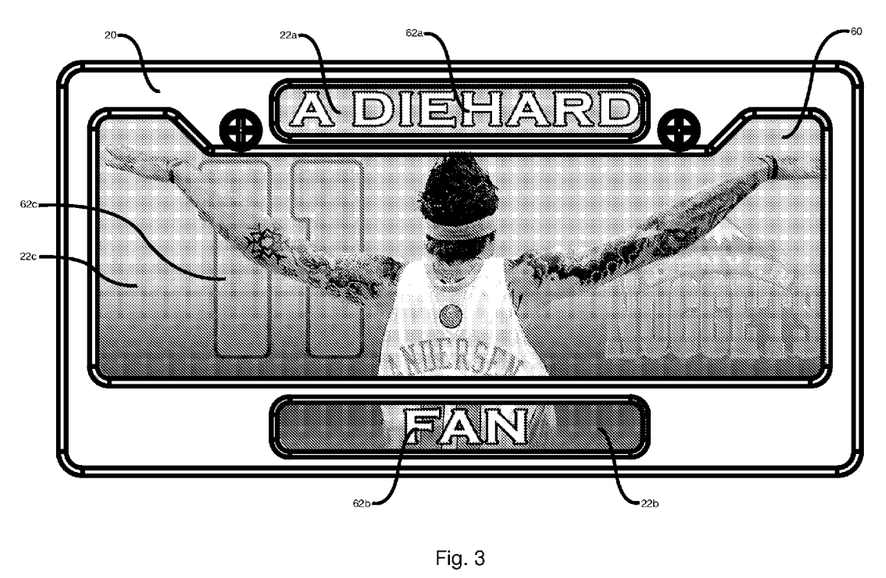
FIG. 3 is a top plan view of the portable device having a changeable illuminated display illustrating an image visible through open spaces formed in a front structure of a frame structure in accordance with the invention.
Figure 4:
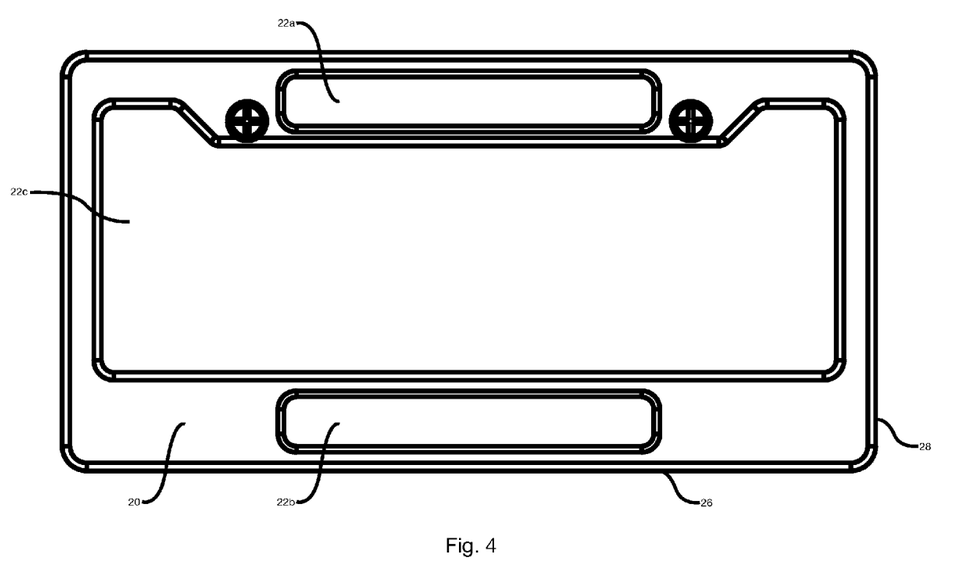
FIG. 4 is a top plan view of the front structure of the frame structure.

With particular reference to FIG. 3, the representative phrase 62a "A DIEHARD" formed on the digital image 60 is visible through the open space 22a. The representative phrase 62b "FAN" formed on the digital image 60 is visible through the open space 22b. Other representative phrases and insignia 62c formed on the digital image are visible through the open space 22c (including marks owned by the NBA and the Denver Nuggets). An advantage of the invention lies in the fact that the larger open space 22c is available for the display of information in addition to the relatively smaller open spaces 22a and 22b.

The digital image 60 includes information that may include partial phrases that when combined form another phrase such as the combination of the representative phrase 62a "A DIEHARD" and the representative phase 62b "FAN" to provide the representative phase "A DIEHARD FAN". The phrases 62a and 62b are advantageously positioned in the license plate frame structure 12 (in open spaces 22a and 22b) such that the two phrases are customarily combined by the eye of a viewer to form the representative phrase "A DIEHARD FAN". The information displayed in the open space 22c adds context to the combined phrase and displays the user's loyalty (in the case of a sports team and/or sports player as illustrated). The representative phrases 62a "A DIEHARD" and 62b "FAN", as well as the representative phrases 62c are illustrative only and a plurality of digital images 60 provide information including other combinations of phrases in a plurality of areas of interest to a user including sports teams and players, musical performers and groups, alma maters and the like.

Figure 9:
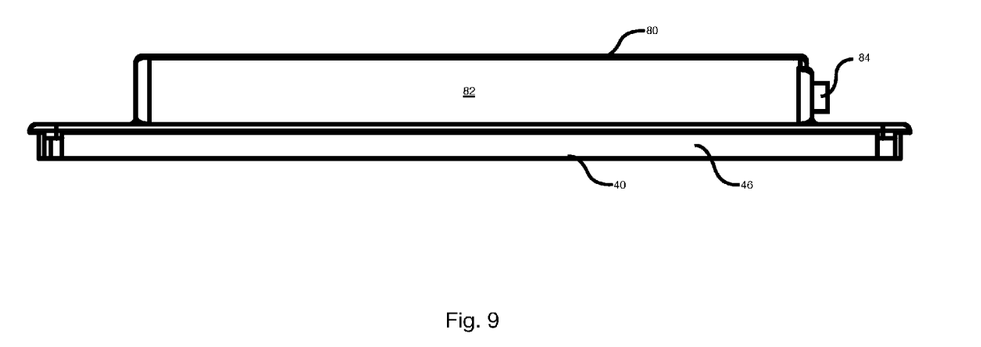
FIG. 9 is a side elevation view of the back structure of FIG. 8.

The back structure 40 of the license plate frame structure 12 has a thin profile of ½ inch and a battery compartment 80 having a wall 82 of preferably ¾ inch that serves as a pedestal upon which to place upright the portable device 10 upon a flat surface such as that of a desktop or a surface adjacent a rear window of a vehicle. The wall 82 is coplanar with a side wall 46 of the back structure 40 (FIG. 9).

The back structure 40 also has a switch 84 coupled to a control circuit as further described below. Operation of the switch 84 opens and closes the circuit that powers the compact image display device 70.

Figure 10:
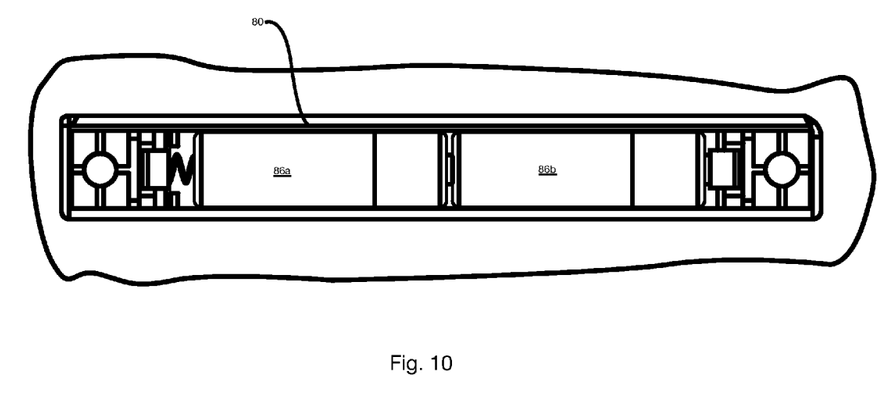
FIG. 10 is a cutaway view of a battery compartment formed in the back structure of FIG. 8.

The battery compartment 80 is sized and configured to receive two AA batteries 86a and 86b (FIG. 10). Batteries

Figure 12:
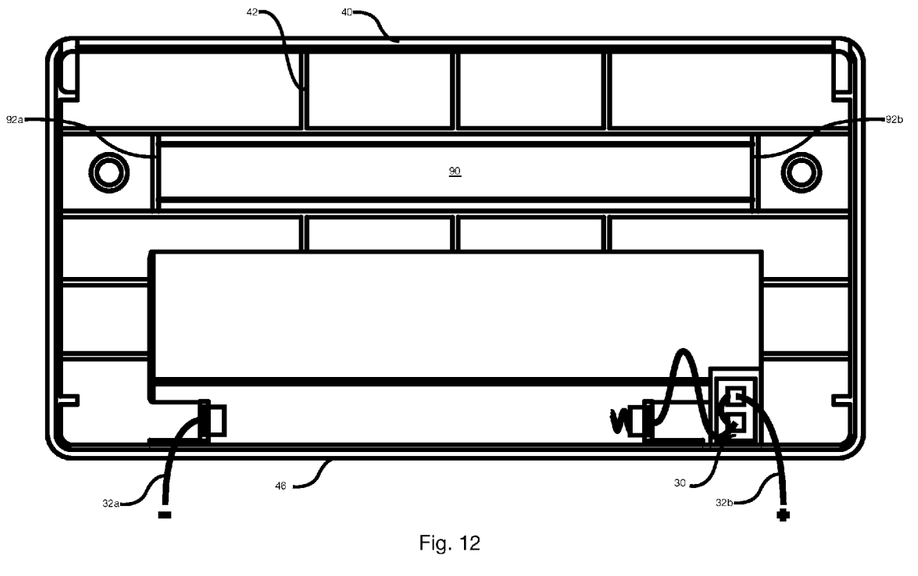
FIG. 12 is a bottom plan view of the back structure illustrating compact image display device circuitry and slots formed to receive a strap.

86a and 86b are connected in series to control circuitry 30 (FIG. 12), the switch 84 and the compact image display device 70.

Figure 2:
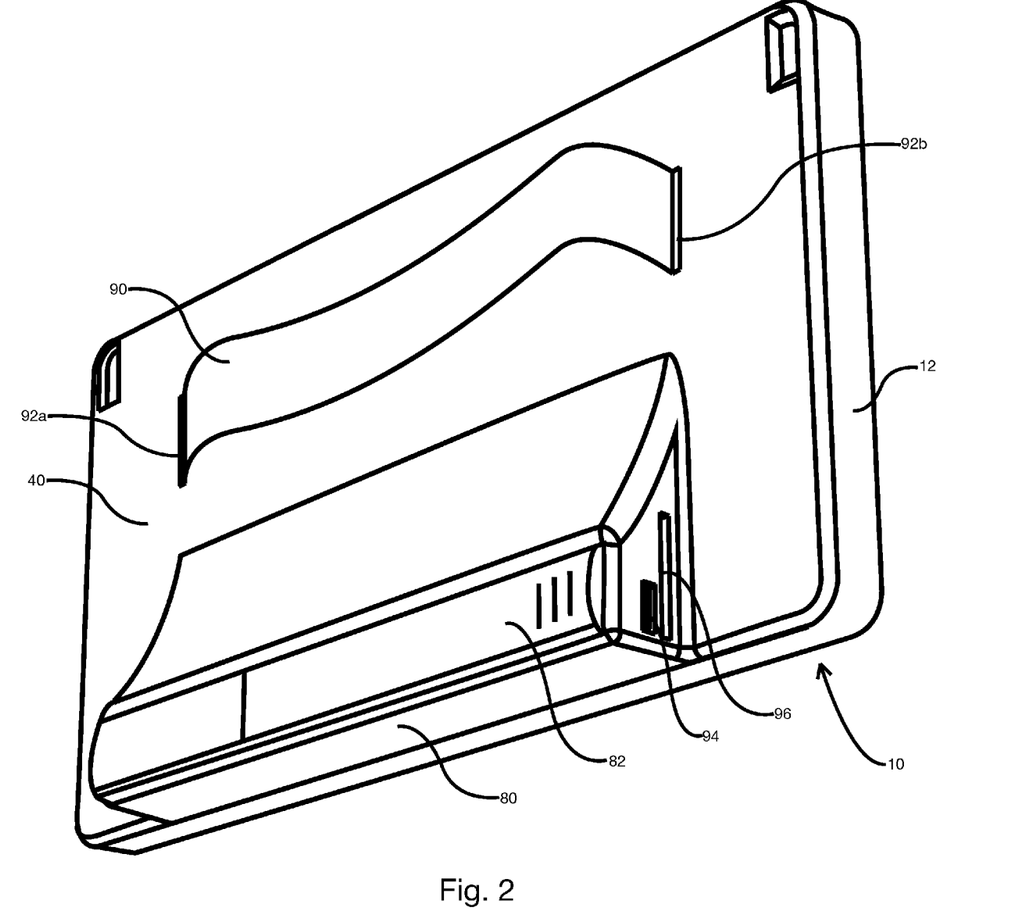
FIG. 2 is a rear perspective view of the portable device having a changeable illuminated display of FIG. 1.
Figure 13:
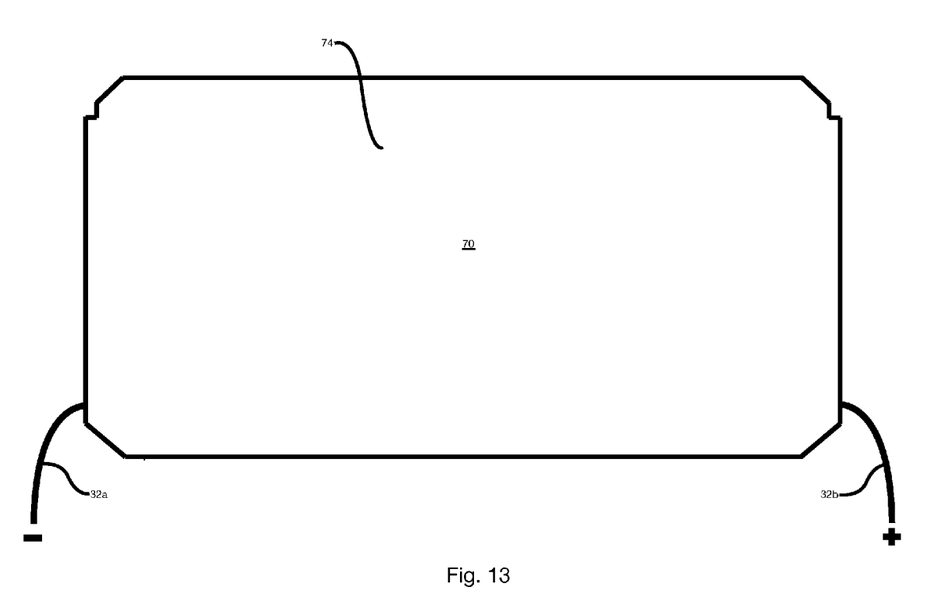
FIG. 13 is a plan view of the compact image display device.

The compact image display device 70 is preferably a thin LCD display electrically coupled to, and controlled by, the control circuitry 30. The compact image display device 70 is preferably rectangular and is 7⅞ inches long by 3⅞ inches wide (FIG. 13). The control circuitry 30 has coupled thereto a USB interface 94 and a Secure Digital Card interface 96 (FIG. 2). Interfaces 94 and 96 provide connectivity to devices from which images for display on the compact image display device 70 can be provided to the control circuitry 30. The control circuitry 30 may include a memory coupled thereto for storing images.

Figure 11:
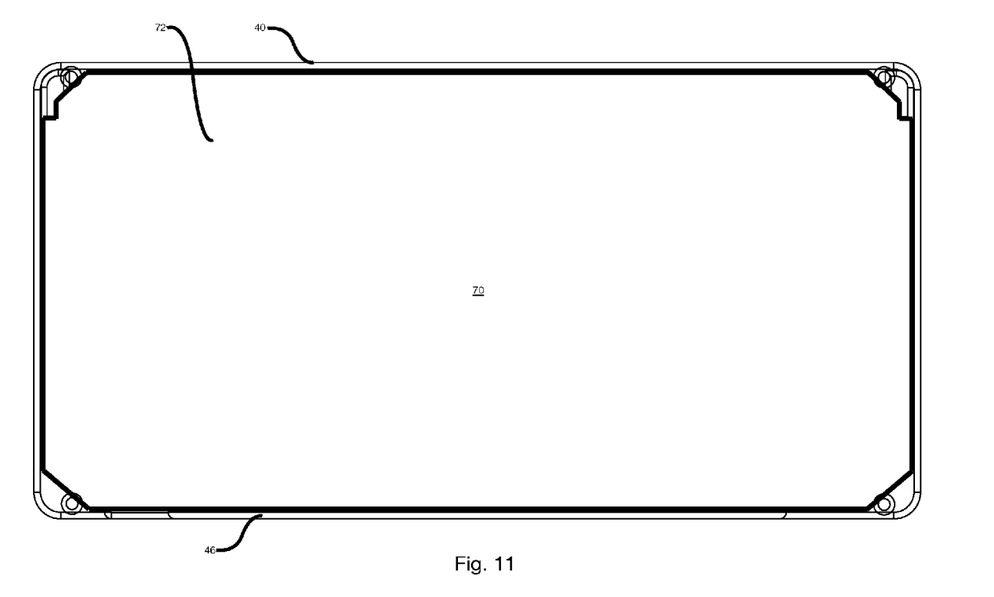
FIG. 11 is a bottom plan view of the back structure illustrating a compact image display device closely held in the back structure of FIG. 8.

The back structure 40 of the license plate frame 12 is sized and configured to closely receive the compact image display device 70 as illustrated in FIG. 11. Ribs 42 formed on an inside surface of the back structure 40 support and position the compact image display device 70 within the back structure 40.

In the embodiment illustrated, the front structure 20 is joined and secured to the back structure 40 by means of screws. The compact image display device 70 is held closely within the license plate frame structure 12 formed by the joining of the front and back structures 20 and 40. The front and back structures 20 and 40 have coextensive sides that form the sides of the license plate frame structure 12 when joined.

Figure 8:
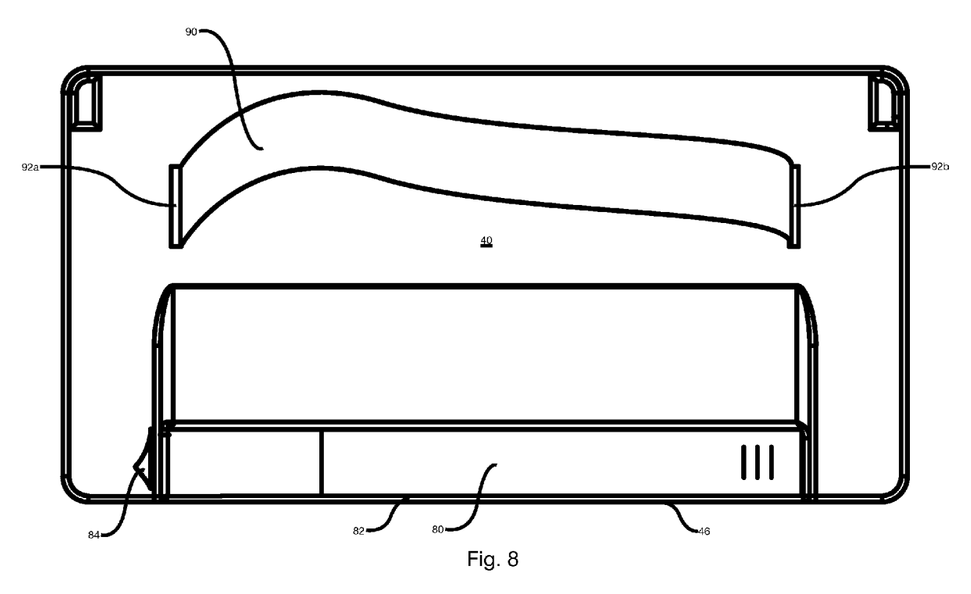
FIG. 8 is a top plan view of a back structure of the frame structure.

The back structure 40 also has a ¾ inch strap 90 that is receivable in slots 92a and 92b formed in spaced relationship one to the other (FIG. 2 and FIG. 8). The strap 90 is preferably adjustable and allows the portable device 10 to be hung from a variety of places such as from mirrors and refrigerator door handles as well as from a user's limb, and more particularly from a user's arm.

The illustrative embodiment of the portable device having a changeable illuminated display described above provides a portable, light-weight, placeable and wearable license plate frame structure formed to closely receive a compact image display device that displays a digital image. Digital images are displayed within the license plate frame structure to provide a versatile display device that may be used in a variety of circumstances and to express a variety of information.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A portable device comprising:
   a license plate frame structure, a plurality of openings being formed in the license plate frame structure, the plurality of openings comprising first and second open spaces disposed at top and bottom positions, respectively, of the license plate frame structure, and the plurality of openings further comprising a third open space disposed between the first and second open spaces;
   a compact image display device operable to display an image, the compact image display device held and positioned relative to the license plate frame structure such that first, second and third portions of the image, when displayed by the compact image display device, are visible through the first, second and third open spaces, respectively;
   a strap attached to the license plate frame structure;
   a control circuitry coupled to the compact image display device; and
   a Secure Digital Card interface coupled to the control circuitry;
   wherein a pedestal is formed at a back and lower portion of the license plate frame structure,
   wherein the license plate frame structure has a front structure and a back structure, the front structure being secured to the back structure by a number of screws, and
   wherein, when a surface of the compact image display device is illuminated, the first, second and third open spaces are sized and positioned to collectively expose a portion of the illuminated surface.

2. The portable device of claim 1, wherein further the control circuitry is held within the license plate frame structure.

3. The portable device of claim 1, further comprising:
   a USB interface coupled to the control circuitry.

4. The portable device of claim 1, wherein the first and second open spaces are of equal area and generally rectangular shape, wherein the first and second open spaces are disposed at a center top position and a center bottom position, respectively, of the license plate frame structure, and wherein the third open space is a larger open space of generally rectangular shape.

5. The portable device of claim 1, wherein the compact image display is configured to display a digital image, and wherein the first and second open spaces are sized and positioned such that an entire first word in the digital image is visible through the first open space, and such that an entire second word in the digital image is visible through the second open space.

6. The portable device of claim 1, wherein the compact image display is configured to display a digital image including a picture and a word, and wherein the first and second open spaces are sized and positioned such that an entirety of the word is visible through the first open space, and such that at least a portion of the picture is visible through the second open space.

7. The portable device of claim 1, wherein the compact image display device is an LCD display.

8. The portable device of claim 1, wherein the control circuitry includes a memory for storing images.

9. The portable device of claim 1, wherein ribs formed on an inside surface of the back structure support and position the compact image display device within the back structure.

10. A portable device comprising:
    a license plate frame structure having a front structure and a back structure, a plurality of openings being formed in the front structure, and the plurality of openings comprising first, second and third open spaces, the third open space disposed between the first and second open spaces;
    a compact image display device held between the front and back structures, the compact image display device operable to display an image, the compact image display device positioned relative to the front structure such that first, second and third portions of the image, when displayed by the compact image display device, are visible through the first, second and third open spaces, respectively;
    a strap attached to the license plate frame structure;

a control circuitry coupled to the compact image display device; and a Secure Digital Card interface coupled to the control circuitry;

wherein a pedestal is formed at a back and lower portion of the license plate frame structure, wherein the front structure is secured to the back structure by a number of screws, and wherein, when a surface of the compact image display device is illuminated, the first, second and third open spaces are sized and positioned to collectively expose a portion of the illuminated surface.

11. The portable device of claim 10, wherein the control circuitry is held within the back structure.

12. The portable device of claim 10, further comprising: a USB interface coupled to the control circuitry.

13. The portable device of claim 10, wherein the first and second open spaces are of equal area and generally rectangular shape, wherein the first and second open spaces are disposed at a center top position and a center bottom position, respectively, of the front structure, and wherein the third open space is a larger open space of generally rectangular shape.

14. The portable device of claim 10, wherein the compact image display is configured to display a digital image, and wherein the first and second open spaces are sized and positioned such that an entire first word in the digital image is visible through the first open space, and such that an entire second word in the digital image is visible through the second open space.

15. The portable device of claim 10, wherein the compact image display is configured to display a digital image including a picture and a word, and wherein the first and second open spaces are sized and positioned such that an entirety of the word is visible through the first open space, and such that at least a portion of the picture is visible through the second open space.

16. The portable device of claim 10, wherein first and second openings from among the plurality of openings are generally rectangular shaped, a portion of the front structure extending between the first and second openings.

17. The portable device of claim 10, wherein the compact image display device is an LCD display.

18. The portable device of claim 10, wherein the control circuitry includes a memory for storing images.

19. The portable device of claim 10, wherein ribs formed on an inside surface of the back structure support and position the compact image display device within the back structure.

20. A portable device comprising:

a license plate frame structure, first and second openings of generally rectangular shape formed in the license plate frame structure, and a third opening formed in the license plate frame structure between the first and second openings;

a compact image display device operable to display a digital image, the compact image display device held and positioned relative to the license plate frame structure such that first, second and third portions of the digital image, when displayed by the compact image display device, are visible through the first, second and third openings, respectively;

a strap attached to the license plate frame structure;

a control circuitry coupled to the compact image display device; and a Secure Digital Card interface coupled to the control circuitry;

wherein a pedestal is formed at a back and lower portion of the license plate frame structure, and wherein the license plate frame structure has a front structure and a back structure, the front structure being secured to the back structure by a number of screws.

21. The portable device of claim 20, further comprising: a switch operable to open and close a circuit configured to power the compact image display device.

22. The portable device of claim 20, wherein the control circuitry is configured to control the compact image display device.

23. The portable device of claim 20, wherein the compact image display device is an LCD display.

24. The portable device of claim 20, wherein the control circuitry includes a memory for storing images.

25. The portable device of claim 20, wherein ribs formed on an inside surface of the back structure support and position the compact image display device within the back structure.

* * * * *